United States Patent [19]

Watanabe

[11] Patent Number: 4,742,445

[45] Date of Patent: May 3, 1988

[54] SUPERVISORY CONTROL COMPUTER SYSTEM OF COMPOUND GENERATING PLANT

[75] Inventor: Takayuki Watanabe, Hyogo, Japan

[73] Assignee: Mitsubishi Denki Kabushiki Kaisha, Tokyo, Japan

[21] Appl. No.: 854,899

[22] Filed: Apr. 23, 1986

[30] Foreign Application Priority Data

Apr. 24, 1985 [JP] Japan .................................. 60-88111
Apr. 24, 1985 [JP] Japan .................................. 60-88112

[51] Int. Cl.[4] ........................ G06F 15/46; G06F 3/153

[52] U.S. Cl. .................................... 364/188; 364/138; 364/184; 364/492

[58] Field of Search ............... 364/188, 189, 146, 147, 364/171, 184–187, 492–495, 138, 139

[56] References Cited

U.S. PATENT DOCUMENTS

| | | | |
|---|---|---|---|
| 3,694,899 | 9/1972 | Booth | 340/147 R |
| 3,937,934 | 2/1976 | Pasemann | 364/189 X |
| 3,971,000 | 7/1976 | Cromwell | 364/189 X |
| 4,001,807 | 1/1977 | Dallimonti | 364/189 |
| 4,303,973 | 12/1981 | Williamson, Jr. et al. | 364/189 |
| 4,418,381 | 11/1983 | Molusis et al. | 364/188 X |
| 4,644,478 | 2/1987 | Stephens et al. | 364/185 X |

OTHER PUBLICATIONS

Hanes–"Design Alarm Systems to Favor Critical Information"–Control Engineering–Oct. 1978–pp. 49–51.

Machine Design, vol. 56, No. 12, May 31, 1984, pp. 88–90 & 93; Cleveland, Ohio, U.S., "Programmable Controllers".

*Primary Examiner*—Joseph Ruggiero
*Attorney, Agent, or Firm*—Bernard, Rothwell & Brown

[57] ABSTRACT

In a supervisory control computer system of a compound generating plant, an output permission selecting switch for a man-machine interface means such as CRT, T/W or the like is installed corresponding to gas turbine generating facilities and steam turbine generating facilities, and condition of the output permission selecting switch is added to output requirements to the man-machine interface means, thereby selection of output/-stop is performed per each of the generating facilities.

2 Claims, 3 Drawing Sheets

SUPERVISORY CONTROL COMPUTER SYSTEM OF COMPOUND GENERATING PLANT

BACKGROUND OF THE INVENTION

1. Field of the Invention

The present invention relates to a supervisory control computer system of a compound generating plant which is constituted by a plurality of gas turbines and steam turbines.

2. Description of the Prior Art

FIG. 1 is a block diagram of a supervisory control computer system of a compound generating plant in the prior art, for example, that shown in Mitsubishi Denki Technical Report, Vol. 57, No. 11 (1983) "Total digital supervisory control system in a compound generating plant". In FIG. 1, reference numeral 1 designates gas turbine generating facilities, numeral 2 steam turbine facilities, numeral 3 a supervisory control computer system, numeral 4 an operation unit being the kernel of the supervisory control computer system 3, numerals 5, 6 cathode ray tube (hereinafter referred to as "CRT") display devices to indicate a message, a system diagram or the like, numeral 7 an operator console to input the CRT display mode or the like, numeral 8 a data input/output device to input or output data required for the supervisory control, and numeral 9 a memory to store data required for the operation of the system.

Operation of the above system will be described. The supervisory control computer system 3 always collects data of the gas turbine generating facilities 1 or the steam turbine generating facilities 2 by the data input/output device 8, and stores the data in the memory 9. If the operator console 7 selects the CRT display mode of the message, the system diagram or the like, the operation unit 4 executes decision processing of display mode of the CRT display devices in step 10 shown in FIG. 2 so as to discriminate the CRT display mode. Edit processing of the display data of the CRT display devices is executed in step 11 of FIG. 2 based on data of the memory 9 so as to edit the data. Next, indication processing of the CRT display devices is executed in step 12 of FIG. 2 thereby the indication output is supplied to the CRT display device 5 or 6 so as to indicate the message, the system diagram or the like.

Since the supervisory control computer system of the compound generating plant in the prior art is constituted as above described, when the compound generating plant as a whole is at running state, if the regular inspection is made on one turbine facility which is stopped and started individually, not only the information required for the running but also a message of the turbine generating facilities under the regular inspection are outputted to the man-machine interface means such as CRT, T/W or the like; thereby the running of the other turbine or turbines may be disturbed.

SUMMARY OF THE INVENTION

Main object of the invention is to provide a useful supervisory control computer system of a compound generating plant, which eliminates the above disadvantages of the prior art.

Another object of the invention is to provide a supervisory control computer system of a compound generating plant, wherein output permission selecting switches corresponding to generating facilities selectively enable or disable output to a CRT, typewriter or the like; thereby output and stop states for the display of information concerning the generting facilities undergoing regular inspection can be selected.

Still another object of the invention is to provide a supervisory control computer system of a compound generating plant, wherein output requirements to a CRT or a typewriter are selected by output change selecting switches corresponding to respective generating facilities, and information of the generating facilities under the regular inspection can be outputted to either a standing CRT or a non-standing CRT or typewriter without disturbance.

Other and further objects and advantages of the invention will appear more fully from the following description of embodiments referring to the accompanying drawings.

PREFERRED EMBODIMENTS OF THE INVENTION

An embodiment of the invention will now be described referring to the accompanying drawings.

Figure 1:
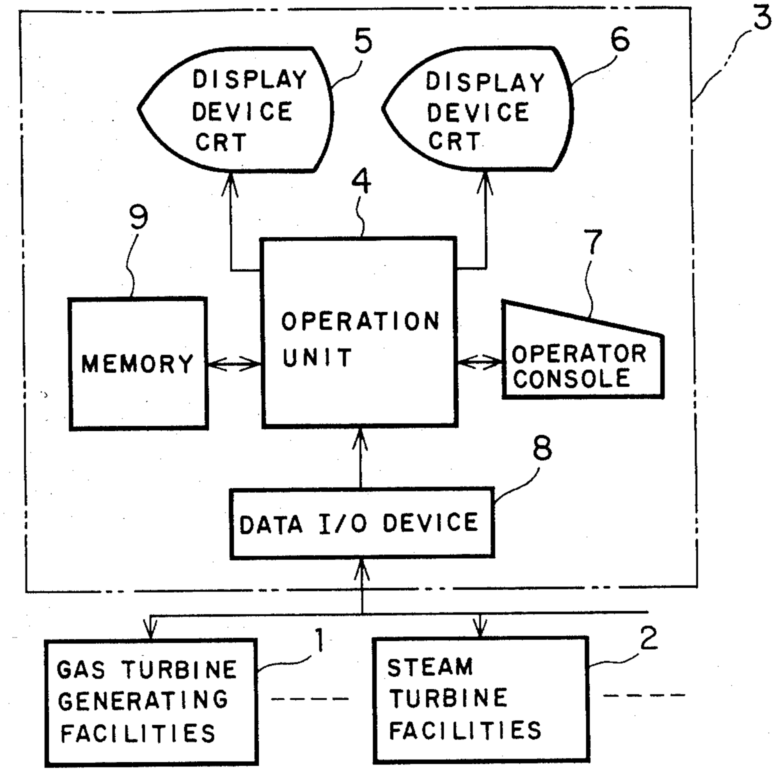
FIG. 1 (PRIOR ART)
FIG. 1 is a block diagram of a supervisory control computer system of a compound generating plant in the prior art.
Figure 2:
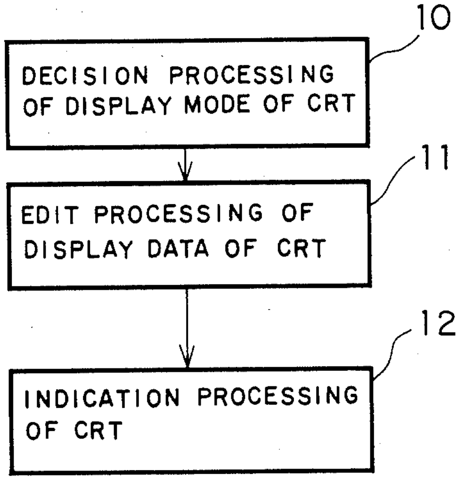
FIG. 2 (PRIOR ART)
FIG. 2 is a flow chart illustrating operation of the system in FIG. 1.
Figure 3:
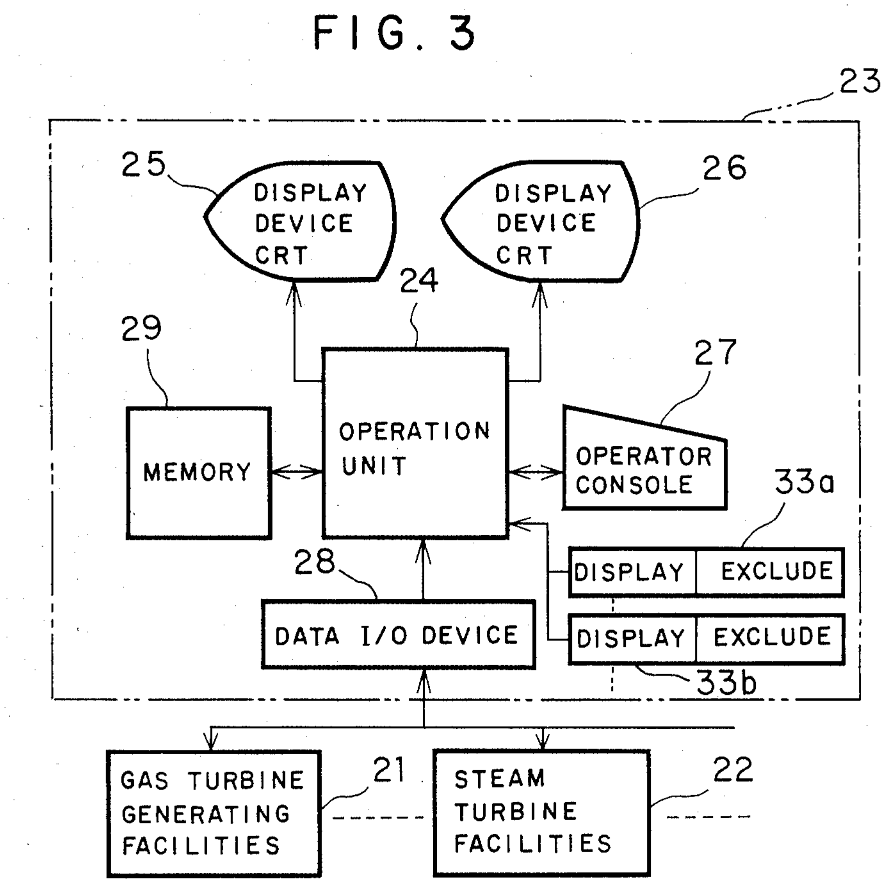
FIG. 3 is a block diagram of a supervisory control computer system of a compound generating plant as an embodiment of the invention.

In FIG. 3, reference numeral 21 designates gas turbine generating facilities, numeral 22 steam turbine generating facilities, numeral 23 a supervisory control computer system, numeral 24 an operation unit being the kernel of the supervisory control computer system 23, numerals 25, 26 CRT display devices to indicate a message, a system diagram or the like, numeral 27 an operator console to input the CRT display mode or the like, numeral 28 a data input/output device to input or output data required for the supervisory control, and numeral 29 a memory to store data required for the operation of the system. Numerals **33*a*, 33*b*** designate CRT display permission selecting switches installed corresponding to respective generating facilities.

Figure 4:
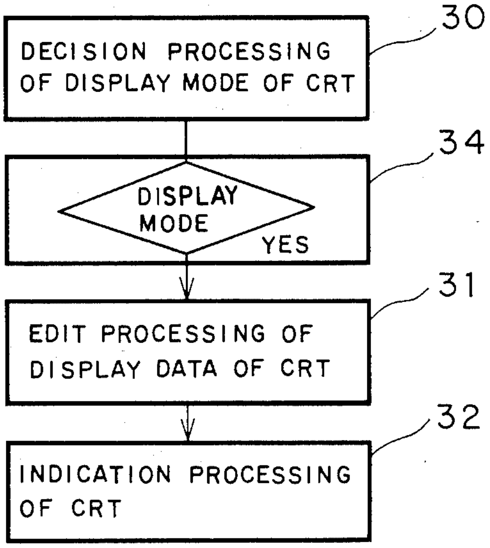
FIG. 4 is a flow chart illustrating operation of the system in FIG. 3.

Operation of the above system will be described. The supervisory control computer system 23 always collects data of the gas turbine generating facilities 21 or the steam turbine generating facilities 22 by the data input/output device 28, and stores the data in the memory 29. If the operator console 27 selects the CRT display mode of the message, the system diagram or the like, the operation unit 24 executes decision processing of the display mode of the CRT display devices in step 30 shown in FIG. 4 so as to discriminate the CRT display mode. The output/reject mode of the output permission selecting switches **33*a*, 33*b* is discriminated by indication permission decision processing of the CRT display devices in step 34 of FIG. 4. At the output mode, edit processing of the display data of the CRT display devices is executed in step 31 of FIG. 4 based on data stored in the memory 29 so as to edit the data. Indication processing of the CRT display devices is executed in step 32 of FIG. 4; thereby the indication output is supplied to the CRT display device 25 or 26 so as to indicate the message, the system diagram or the like. When the indication permission selecting switches 33***a*, 33*b* are at the reject mode, processing at step 34 and so forth is not executed but the CRT display device 25 or 26 remains at the present displayed state.

Although the output permission selecting switches are provided with the indication/reject mode in the above embodiment, a selecting switch of another name or for another object may also be used. Although means for the CRT display is shown, other indication device or man-machine interface such as T/W, voice notice may be used. Further, any compound generating plant may be used.

Figure 5:
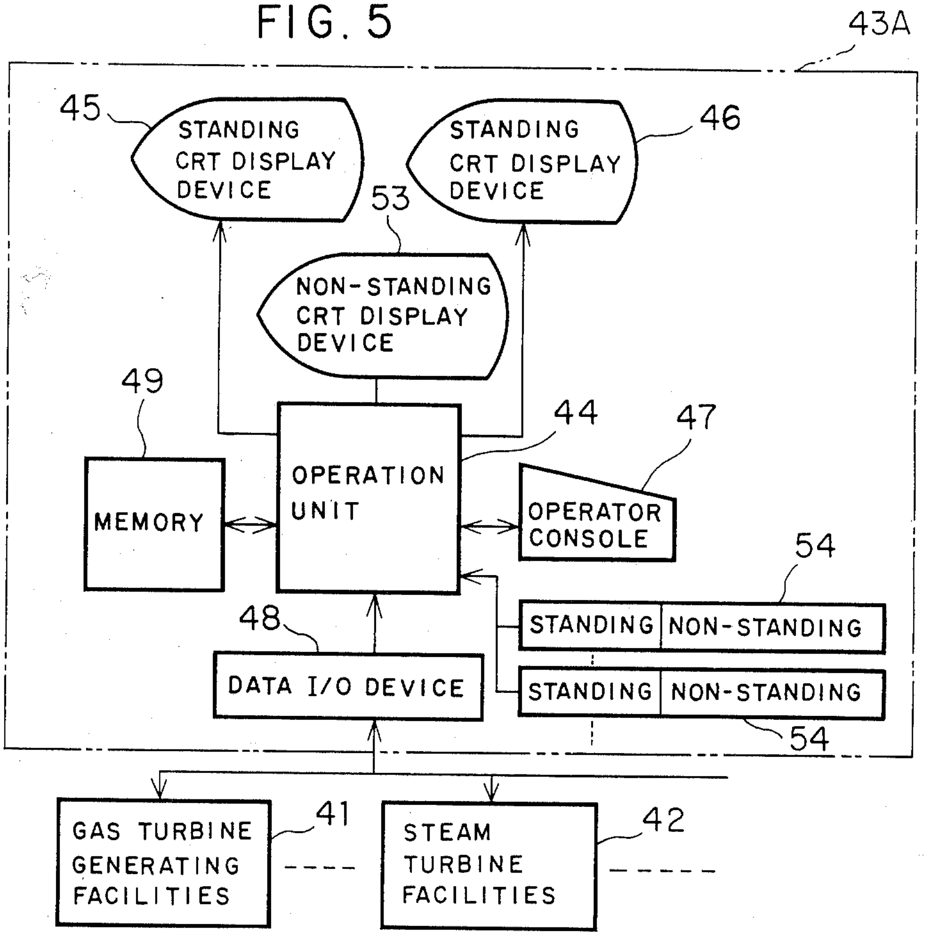
FIG. 5 is a block diagram of a supervisory control computer system of a compound generating plant as another embodiment of the invention.
Figure 6:
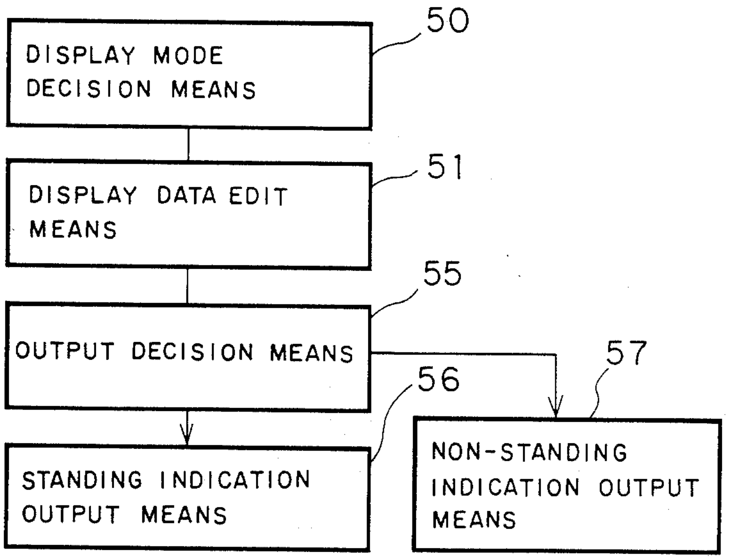
FIG. 6 is a flow chart illustrating operation of the system in FIG. 5.

Next, another embodiment of the invention will be described referring to FIG. 5 and FIG. 6. In FIG. 5, numeral 41 designates gas turbine generating facilities, numeral 42 steam turbine generating facilities, numeral 43A a supervisory control computer system, numeral 44 an operation unit being the kernel of the supervisory control computer system 43A, numerals 45, 46 standing CRT display devices as standing man-machine interface means to indicate the message, the system diagram or the like, numeral 47 an operator console to input the CRT display mode or the like, numeral 48 a data input/output device to input or output data required for the supervisory control, numeral 49 a memory to store data required for the operation of the system, numeral 53 a non-standing CRT display device as non-standing man-machine interface means, and numeral 54 output change selecting switches as standing/non-standing output change selecting means installed corresponding to the gas turbine generating facilities 41 and the steam turbine generating facilities 42 respectively. As shown in FIG. 6, the operation unit 44 comprises a display mode decision means 50 to discriminate the CRT display mode input from the operator console 47, a display data edit means 51 to edit the display data, an output decision means 55 to discriminate mode of the output change selecting switches 54, and a standing indication output means 56 and a non-standing indication output means 57 to output indication data to any of the standing CRT display devices 45, 46 and the non-standing CRT display device 53 respectively.

Operation of the above system will be described. Data of the gas turbine generating facilities 41 and the steam turbine generating facilities 42 is collected through the data input/output device 48 and stored in the memory 49. If the CRT display mode of the message, the system diagram or the like is selected by means of key board operation in the operator console 47, the operation unit 44 executes decision of the display mode selected by the display mode decision means 50. The selected data is edited by the display data edit means 51 based on data stored in the memory 49 and required for the system operation. The output decision means 55 executes decision to which of the standing/non-standing mode the output change selecting switch 54 is changed. If changed to the standing mode, indication output from the indication output means 56 is indicated to any of the standing CRT display devices 45, 46. At the non-standing mode, indication output from the indication output means 57 can be indicated as the message, the system diagram or the like onto the non-standing display display device 53. As a result, careless indication of the message during the inspection to the standing display devices 45, 46 as standing man-machine interface means can be prevented.

According to the invention as above described, the output permission switch for the man-machine interface means such as CRT, T/W or the like is installed corresponding to each of the generating facilities, and condition of the output permission selecting switch is added to output requirements to the man-machine interface means and the selection becomes possible, thereby the running of the compound generating plant is not disturbed.

Further, according to the invention, the standing man-machine interface means and the standing/non-standing output change selecting means correspond to each of the generating facilities in parallel, the non-standing man-machine interface means is installed separately from these means, and information of the generating facilities is inputted selectively to any of the standing man-machine interface means or the non-standing man-machine interface means by output of any of the standing/non-standing output change selecting means changed corresponding to the information of the generating facilities. Thereby when any one of the generating facilities at running state is repaired, checked or inspected, the message during the inspection other than information required for the running can be effectively prevented from being inputted to the standing man-machine interface means and the disturbance of the running can be prevented before it happens.

What is claimed is:

1. A supervisory control computer system of a compound generating plant, comprising:

(a) a data input/output device for inputting data of gas turbine generating facilities and steam turbine generating facilities of the compound generating plant;

(b) an operation unit for receiving an output from the data input/output device;

(c) a memory connected to the operation unit for storing data of the gas turbine facilities and the steam turbine facilities;

(d) a plurality of display devices for indicting a message, a system diagram or the like based on output from the operation unit;

(e) an operator console for performing the display mode of the display devices through the operation unit; and (f) indication permission selecting switches of the display devices installed corresponding to each of the generating facilities and connected to the operation unit for preventing a change in the display devices concerning the respective generating facilities.

2. A supervisory control computer system of a compound generating plant constituted by a plurality of gas turbines and steam turbines, comprising:

(a) a data input/output device for inputting data of gas turbine generaitng facilities and steam turbine gnerating facilities of the compound generating plant;

(b) an operation unit for receiving output from the data input/output device;

(c) a memory connected to the operation unit for storing data of the gas turbine facilities and the steam turbine facilities;

(d) a standing display device for indicating a message, a diagram or the like based on an output from the operation unit concerning an operating turbine generating facility;

(e) a non-standing display device for displaying information based on output from the operation unit concerning a non-operating turbine generating facility; and (f) a plurality of switches corresponding to the generating facilities for selecting either the standing display device or the non-standing display device for displaying information of the generating facilities on the respective display devices in accordance with operating or non-operating status of the generating facilities.

* * * * *